United States Patent
Maleki et al.

(10) Patent No.: US 8,289,616 B1
(45) Date of Patent: Oct. 16, 2012

(54) OPTICAL DEVICES BASED ON OPTICALLY COUPLED OPTICAL WHISPERING GALLERY-MODE RESONATORS FORMED ON A ROD

(75) Inventors: Lute Maleki, Pasadena, CA (US); Andrey B. Matsko, Pasadena, CA (US); Anatoliy A. Savchenkov, Glendale, CA (US); Vladimir S. Ilchenko, Arcadia, CA (US); David Seidel, Alta Loma, CA (US)

(73) Assignee: OEwaves, Inc., Pasadena, CA (US)

( * ) Notice: Subject to any disclaimer, the term of this patent is extended or adjusted under 35 U.S.C. 154(b) by 0 days.

(21) Appl. No.: 13/357,023

(22) Filed: Jan. 24, 2012

Related U.S. Application Data

(62) Division of application No. 12/467,248, filed on May 15, 2009, now Pat. No. 8,102,597.

(60) Provisional application No. 61/053,416, filed on May 15, 2008, provisional application No. 61/053,396, filed on May 15, 2008, provisional application No. 61/108,257, filed on Oct. 24, 2008.

(51) Int. Cl.
*H01S 3/13* (2006.01)
*H01S 3/139* (2006.01)
*H01S 3/08* (2006.01)

(52) U.S. Cl. ............................ 359/346; 372/92; 372/108

(58) Field of Classification Search .................. 359/333, 359/346; 372/92, 108
See application file for complete search history.

(56) References Cited

U.S. PATENT DOCUMENTS

| | | | |
|---|---|---|---|
| 4,851,788 A * | 7/1989 | Ives et al. | 331/91 |
| 5,187,409 A * | 2/1993 | Ito | 315/5 |
| 5,204,640 A | 4/1993 | Logan, Jr. | |
| 5,220,292 A | 6/1993 | Bianchini et al. | |
| 5,343,490 A * | 8/1994 | McCall | 372/94 |
| 5,652,556 A * | 7/1997 | Flory et al. | 333/219.1 |
| 5,723,856 A | 3/1998 | Yao et al. | |
| 5,751,747 A | 5/1998 | Lutes et al. | |
| 5,777,778 A | 7/1998 | Yao | |
| 5,909,160 A * | 6/1999 | Dick et al. | 333/234 |
| 5,917,179 A | 6/1999 | Yao | |
| 5,926,496 A * | 7/1999 | Ho et al. | 372/92 |
| 5,929,430 A | 7/1999 | Yao et al. | |
| 5,985,166 A | 11/1999 | Unger et al. | |
| 6,080,586 A | 6/2000 | Baldeschwieler et al. | |
| 6,178,036 B1 | 1/2001 | Yao | |
| 6,203,660 B1 | 3/2001 | Unger et al. | |
| 6,389,197 B1 * | 5/2002 | Iltchenko et al. | 385/28 |

(Continued)

FOREIGN PATENT DOCUMENTS

WO 01/96936 12/2001

(Continued)

OTHER PUBLICATIONS

Michler, P., Kiraz, A., Becher, C., Zhang, L., Hu, E., Imamoglu, A., Schloenfeld, W.V. and Petroff, P.M. (2001), Quantum Dot Lasers Using High-Q Microdisk Cavities. Phys. Status Solidi B, 224: 797-801. doi: 10.1002/(SICI)1521-3951(200104)224:3<797::AID-PSSB797>3.0.CO;2-I.*

(Continued)

*Primary Examiner* — Isam Alsomiri
*Assistant Examiner* — Ari M Diacou
(74) *Attorney, Agent, or Firm* — Perkins Coie LLP

(57) ABSTRACT

Devices having whispering-gallery-mode (WGM) resonators configured to meet requirements of various applications and facilitate fabrication of such devices.

11 Claims, 8 Drawing Sheets

U.S. PATENT DOCUMENTS

| | | |
|---|---|---|
| 6,417,957 B1 | 7/2002 | Yao |
| 6,473,218 B1 | 10/2002 | Maleki et al. |
| 6,476,959 B2 | 11/2002 | Yao |
| 6,487,233 B2 | 11/2002 | Maleki et al. |
| 6,488,861 B2 | 12/2002 | Iltchenko et al. |
| 6,490,039 B2 | 12/2002 | Maleki et al. |
| 6,535,328 B2 | 3/2003 | Yao |
| 6,541,295 B1 * | 4/2003 | Looney .................. 438/29 |
| 6,567,436 B1 | 5/2003 | Yao et al. |
| 6,580,532 B1 | 6/2003 | Yao et al. |
| 6,594,061 B2 | 7/2003 | Huang et al. |
| 6,711,200 B1 * | 3/2004 | Scherer et al. ............ 372/64 |
| 6,762,869 B2 | 7/2004 | Maleki et al. |
| 6,763,052 B2 * | 7/2004 | Huang ..................... 372/92 |
| 6,795,481 B2 | 9/2004 | Maleki et al. |
| 6,798,947 B2 | 9/2004 | Iltchenko |
| 6,853,479 B1 | 2/2005 | Ilchenko et al. |
| 6,871,025 B2 | 3/2005 | Maleki et al. |
| 6,873,631 B2 | 3/2005 | Yao et al. |
| 6,879,752 B1 | 4/2005 | Ilchenko et al. |
| 6,901,189 B1 | 5/2005 | Savchenkov et al. |
| 6,906,309 B2 | 6/2005 | Sayyah et al. |
| 6,922,497 B1 | 7/2005 | Savchenkov et al. |
| 6,928,091 B1 | 8/2005 | Maleki et al. |
| 6,943,934 B1 | 9/2005 | Ilchenko et al. |
| 6,987,914 B2 | 1/2006 | Savchenkov et al. |
| 7,024,069 B2 | 4/2006 | Savchenkov et al. |
| 7,043,117 B2 | 5/2006 | Matsko et al. |
| 7,050,212 B2 | 5/2006 | Matsko et al. |
| 7,061,335 B2 | 6/2006 | Maleki et al. |
| 7,062,131 B2 | 6/2006 | Ilchenko |
| 7,092,591 B2 | 8/2006 | Savchenkov et al. |
| 7,133,180 B2 | 11/2006 | Ilchenko et al. |
| 7,173,749 B2 | 2/2007 | Maleki et al. |
| 7,184,451 B2 | 2/2007 | Ilchenko et al. |
| 7,187,870 B2 | 3/2007 | Ilchenko et al. |
| 7,218,662 B1 | 5/2007 | Ilchenko et al. |
| 7,248,763 B1 | 7/2007 | Kossakovski et al. |
| 7,260,279 B2 | 8/2007 | Gunn et al. |
| 7,283,707 B1 | 10/2007 | Maleki et al. |
| 7,356,214 B2 | 4/2008 | Ilchenko |
| 7,362,927 B1 | 4/2008 | Ilchenko et al. |
| 7,369,722 B2 | 5/2008 | Yilmaz et al. |
| 7,389,053 B1 | 6/2008 | Ilchenko et al. |
| 7,400,796 B1 | 7/2008 | Kossakovski et al. |
| 7,440,651 B1 | 10/2008 | Savchenkov et al. |
| 7,460,746 B2 | 12/2008 | Maleki et al. |
| 7,480,425 B2 | 1/2009 | Gunn et al. |
| 2001/0004411 A1 * | 6/2001 | Yariv ....................... 385/28 |
| 2001/0038651 A1 | 11/2001 | Maleki et al. |
| 2002/0018611 A1 | 2/2002 | Maleki et al. |
| 2002/0018617 A1 | 2/2002 | Iltchenko et al. |
| 2002/0021765 A1 * | 2/2002 | Maleki et al. ............ 375/300 |
| 2002/0081055 A1 | 6/2002 | Painter et al. |
| 2002/0085266 A1 | 7/2002 | Yao |
| 2002/0097401 A1 | 7/2002 | Maleki et al. |
| 2003/0016434 A1 * | 1/2003 | Torchigin ................. 359/286 |
| 2003/0160148 A1 | 8/2003 | Yao et al. |
| 2004/0100675 A1 | 5/2004 | Matsko et al. |
| 2004/0109217 A1 | 6/2004 | Maleki et al. |
| 2004/0179573 A1 * | 9/2004 | Armani et al. ............ 372/94 |
| 2004/0218880 A1 | 11/2004 | Matsko et al. |
| 2004/0240781 A1 | 12/2004 | Savchenkov et al. |
| 2005/0017816 A1 | 1/2005 | Ilchenko et al. |
| 2005/0063034 A1 | 3/2005 | Maleki et al. |
| 2005/0074200 A1 | 4/2005 | Savchenkov et al. |
| 2005/0123306 A1 | 6/2005 | Ilchenko et al. |
| 2005/0128566 A1 | 6/2005 | Savchenkov et al. |
| 2005/0175358 A1 | 8/2005 | Ilchenko et al. |
| 2005/0248823 A1 | 11/2005 | Maleki et al. |
| 2007/0009205 A1 | 1/2007 | Maleki et al. |
| 2007/0153289 A1 | 7/2007 | Yilmaz et al. |
| 2008/0001062 A1 | 1/2008 | Gunn et al. |
| 2008/0075464 A1 | 3/2008 | Maleki et al. |
| 2008/0089367 A1 * | 4/2008 | Srinivasan et al. ........ 372/19 |
| 2008/0310463 A1 | 12/2008 | Maleki et al. |
| 2009/0097516 A1 | 4/2009 | Maleki et al. |
| 2009/0135860 A1 | 5/2009 | Maleki et al. |
| 2009/0237666 A1 * | 9/2009 | Vollmer et al. ............ 356/432 |

FOREIGN PATENT DOCUMENTS

| | | |
|---|---|---|
| WO | 2005/038513 | 4/2005 |
| WO | 2005/055412 | 6/2005 |
| WO | 2005/067690 | 7/2005 |
| WO | 2005/122346 | 12/2005 |
| WO | 2006/076585 | 7/2006 |
| WO | 2007/143627 | 12/2007 |

OTHER PUBLICATIONS

Xudong Fan; Hailin Wang; Lonergan, M.; , "Attaching nanocrystals to a dielectric microsphere: a quantum dot microcavity with extremely high Q-factors," Quantum Electronics and Laser Science Conference, 1999. QELS '99. Technical Digest. Summaries of Papers Presented at the , vol., no., pp. 5/1-5/3, May 23-28, 1999 doi: 10.1109/QELS.1999.807671.*

Braginsky, V.B., et al., "Quality-Factor and Nonlinear Properties of Optical Whispering-Gallery Modes," *Physics Letters A*, 137(7, 8):393-397, May 1989.

Eliyahu, D., et al., "Low Phase Noise and Spurious Levels in Multi-Loop Opto-Electronic Oscillators," *Proceedings of the 2003 IEEE International Frequency Control Sympsoium and PDA Exhibition*, pp. 405-410, May 2003.

Eliyahu, D., et al., "Modulation Response ($S_{21}$) of the Coupled Opto-Electronic Oscillator," *Proceedings of the 2005 IEEE International Frequency Control Symposium and Exposition*, pp. 850-856, Aug. 2005.

Eliyahu, D., et al., "Tunable, Ultra-Low Phase Noise YIG Based Opto-Electronic Oscillator," *IEEE MTT-S International Microwave Symposium Digest*, 3:2185-2187, Jun. 2003.

Gorodetsky, M.L., et al., "Optical Microsphere Resonators: Optimal Coupling to High-$Q$ Whispering-Gallery Modes," *J. Opt. Soc. Am. B*, 16(1):147-154, Jan. 1999.

Gorodetsky, M.L., et al., "Rayleigh Scattering in High-$Q$ Microspheres," *J. Opt. Soc. Am. B*, 17(6):1051-1057, Jun. 2000.

Gorodetsky, M.L., et al., "Ultimate $Q$ of Optical Microsphere Resonators," *Optics Letters*, 21(7):453-455, Apr. 1996.

Hryniewicz, J.V., et al., "Higher Order Filter Response in Coupled Microring Resonators," *IEEE Photonics Technology Letters*, 12(3):320-322, Mar. 2000.

Huang, S., et al., "A 'Turnkey' Optoelectronic Oscillator with Low Acceleration Sensitivity," *2000 IEEE/EIA International Frequency Control Symposium and Exhibition*, pp. 269-279, Jun. 2000.

Ilchenko, V., et al., "Electrooptically Tunable Photonic Microresonators and Photonic Bandgap Waveguide Coupling for Micro-Optoelectronic Oscillators," *GOMACTech 2003*, Tampa, Florida, pp. 1-4.

Ilchenko, V., et al., "High-Q Microsphere Cavity for Laser Stabilization and Optoelectronic Microwave Oscillator," *Proceedings SPIE Microresonators and Whispering-Gallery Modes*, vol. 3611, pp. 190-198, Jan. 1999.

Ilchenko, V., et al., "Microsphere Integration in Active and Passive Photonics Devices," *Proc. of SPIE Laser Resonators III*, vol. 3930, pp. 154-162, Jan. 2000.

Ilchenko, V., et al., "Microtorus: a High-Finesse Microcavity with Whispering-Gallery Modes," *Optics Letters*, 26(5):256-258, Mar. 2001.

Ilchenko, V., et al., "Pigtailing the High-$Q$ Microsphere Cavity: A Simple Fiber Coupler for Optical Whispering-Gallery Modes," *Optics Letters*, 24(11):723-725, Jun. 1999.

Ilchenko, V., et al., "Sub-Micro Watt Photonic Microwave Receiver," *IEEE Photonics Technology Letters*, 14(11):1602-1604, Nov. 2002.

Ilchenko, V., et al., "Tunability and Synthetic Lineshapes in High-Q Optical Whispering Gallery Modes," *Proc. of SPIE Laser Resonators and Beam Control VI*, vol. 4969, pp. 195-206, Jan. 2003.

Ilchenko, V., et al., "Whispering-Gallery-Mode Electro-Optic Modulator and Photonic Microwave Receiver," *J. Opt. Soc. Am. B*, 20(2):333-342, Feb. 2003.

Ito, H., et al., "InP/InGaAs Uni-Travelling-Carrier Photodiode with 310 GHz Bandwidth," *Electronics Letters*, 36(21):1809-1810, Oct. 2000.

Logan, R., et al., "Stabilization of Oscillator Phase Using a Fiber-Optic Delay-Line," *IEEE 45th Annual Symposium on Frequency Control*, pp. 508-512, May 1991.

Maleki, L., "The Opto-Electronic Oscillator: Prospects for Extending the State of the Art in Reference Frequency Generation," *International Topical Meeting on Microwave Photonics*, pp. 195-198, Oct. 1998.

Maleki, L., et al., *Practical Applications of Microresonators in Optics and Photonics*, Chapter 3: "Crystalline Whispering Gallery Mode Resonators in Optics and Photonics," pp. 133-209, Ed. by A. B. Matsko, CRC Press, 2009.

Matsko, A., et al., "Active Mode Locking with Whispering-Gallery Modes," *J. Opt. Soc. Am. B*, 20(11):2292-2296, Nov. 2003.

Matsko, A., et al., "Whispering-Gallery-Mode based Optoelectronic Microwave Oscillator," *Journal of Modern Optics*, 50(15-17):2523-2542, Feb. 2004.

Matsko, A., et al., "Whispering-Gallery-Mode Resonators as Frequency References. I. Fundamental. Limitations," *J. Opt. Soc. Am. B*, 24(6):1324-1335, Jun. 2007.

Myers, L.E. et al., "Quasi-Phase-Matched Optical Parametric Oscillators in Bulk Periodically Poled $LiNbO_3$," *J. Opt. Soc. Am. B*, 12(11):2102-2116, Nov. 1995.

Savchenkov, A., et al., "Low Threshold Optical Oscillations in a Whispering Gallery Mode $CaF_2$ Resonator," *Physical Review Letters*, 93(24):243905(1-4), Dec. 2004.

Savchenkov, A., et al., "Morphology-dependent photonic circuit elements," *Optics Letters*, 31(9):1313-1315, May 2006.

Savchenkov, A., et al., "Optical combs with a crystalline whispering gallery mode resonator," arXiv:0804.0263v1 [physics.optics], Apr. 2008.

Savchenkov, A., et al., "Whispering-Gallery-Mode Resonators as Frequency References. II. Stabilization," *J. Opt. Soc. Am. B*, 24(12):2988-2997, Dec. 2007.

Vassiliev, V.V., et al., "Narrow-Line-Width Diode Laser with a High-$Q$ Microsphere Resonator," *Optics Communications*, 158(1-6):305-312, Dec. 1998.

Yao, X.S., et al., "A Novel Photonic Oscillator," *Digest of the LEOS Summer Topical Meetings*, pp. 17-18, Aug. 1995.

Yao, X.S., et al., "A Novel Photonic Oscillator," *TDA Progress Report 42-122*, pp. 32-43, Aug. 1995.

Yao, X.S., et al., "Converting Light into Spectrally Pure Microwave Oscillation," *Optics Letters*, 21(7):483-485, Apr. 1996.

Yao, X.S., et al., "Coupled Optoelectronic Oscillators for Generating Both RF Signal and Optical Pulses," *Journal of Lightwave Technology*, 18(1):73-78, Jan. 2000.

Yao, X.S., et al., "Dual Microwave and Optical Oscillator," *Optics Letters*, 22(24):1867-1869, Dec. 1997.

Yao, X.S., et al., "Multiloop Optoelectronic Oscillator," *IEEE Journal of Quantum Electronics*, 36(1):79-84, Jan. 2000.

Yao, X.S., et al., "Optoelectronic Microwave Oscillator," *J. Opt. Soc. Am. B*, 13(8):1725-1735, Aug. 1996.

Yao, X.S., et al., "Optoelectronic Oscillator for Photonic Systems," *IEEE Journal of Quantum Electronics*, 32(7):1141-1149, Jul. 1996.

Yu, J., et al., "Compact Optoelectronic Oscillator with Ultra-Low Phase Noise Performance," *Electronics Letters*, 35(18):1554-1555, Sep. 1999.

\* cited by examiner

Side view

Cylindrical Rod 1010

1020
Closely Spaced Optical Waveguide Loops as WGM Resonators

Top view

Cylindrical Rod 1010

1020
Closely Spaced Optical Waveguide Loops as WGM Resonators

FIG. 11A
FIG. 11B
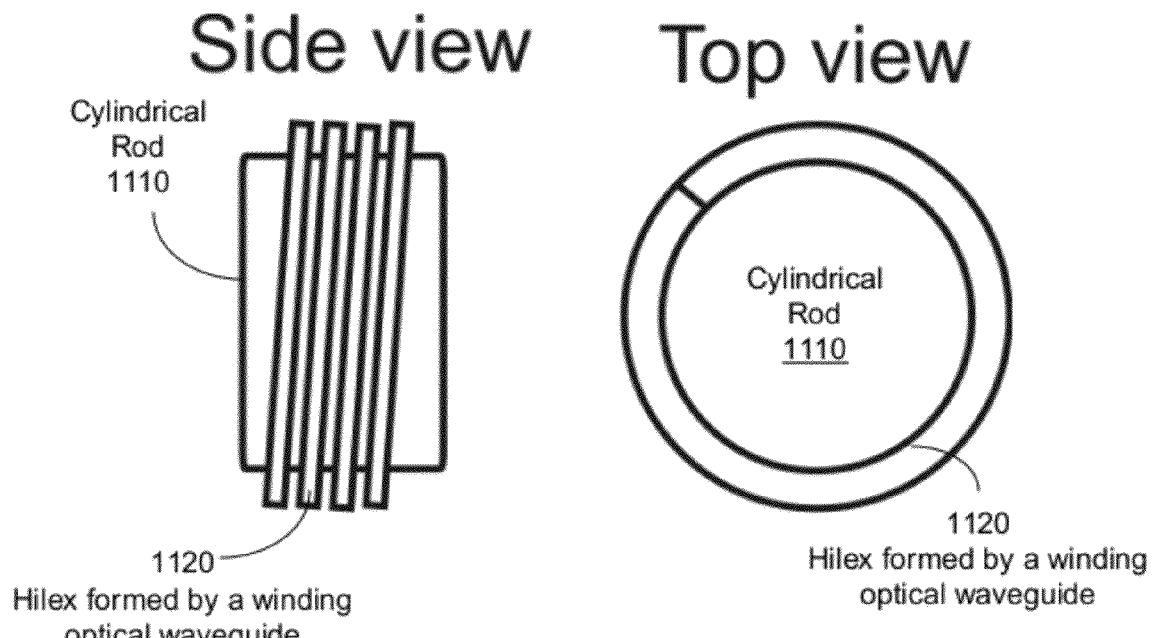
FIG. 11C
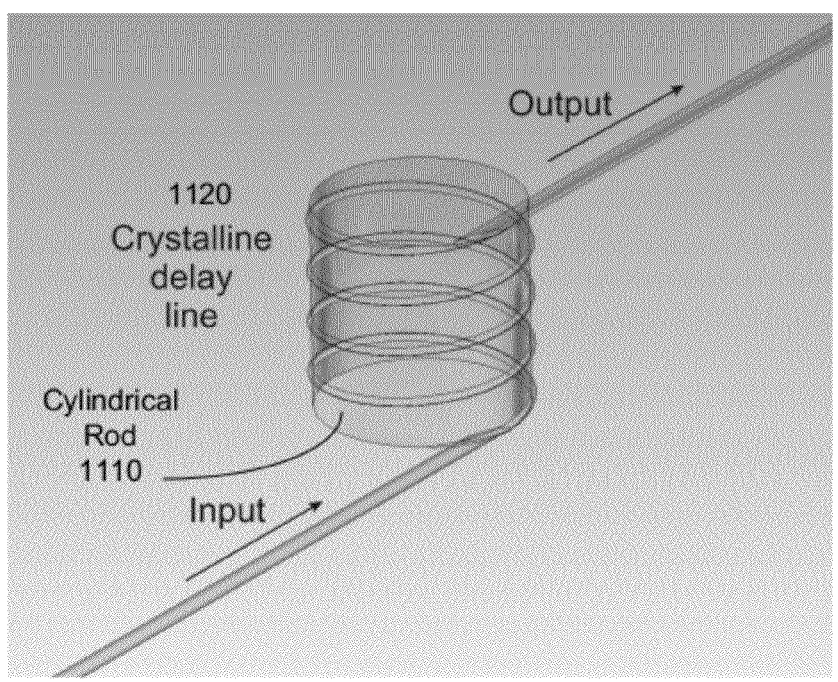

OPTICAL DEVICES BASED ON OPTICALLY COUPLED OPTICAL WHISPERING GALLERY-MODE RESONATORS FORMED ON A ROD

This application is a divisional of U.S. Utility application Ser. No. 12/467,248 entitled "Structures and Fabrication of Whispering-Gallery-Mode Resonators" to issue as U.S. Pat. No. 8,102,597 on Jan. 24, 2012, which claims the benefits of U.S. Provisional Application No. 61/053,416 entitled "Composite Single Mode Whispering Gallery Mode Cavity" and filed May 15, 2008, U.S. Provisional Application No. 61/053,396 entitled "Spectral Engineering in WGM Resonators" and filed May 15, 2008, and U.S. Provisional Application No. 61/108,257 entitled "Conical Resonators for Cheaper and Easier Mass Production" and filed Oct. 24, 2008. The disclosures of the above application are incorporated by reference as part of the disclosure of this document.

BACKGROUND

This document relates to optical resonators and devices using optical resonators.

Optical resonators can be configured in various configurations. Examples of well-known optical resonator designs includes Fabry-Perot optical resonators and optical ring resonators. As another example, an optical material such as a dielectric material may be shaped to construct an optical whispering-gallery-mode ("WGM") resonator which supports one or more resonator modes known as whispering gallery ("WG") modes. These WG modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the equator of the sphere. The resonator dimension is generally much larger than the wavelength of light so that the optical loss due to the finite curvature of the resonators is small. As a result, a high quality factor, Q, e.g., greater than $10^9$, may be achieved in such resonators. Hence, optical energy, once coupled into a whispering gallery mode, can circulate within the WGM resonator with a long photon life time. Such hi-Q WGM resonators may be used in many optical applications, including optical filtering, optical delay, optical sensing, lasers, and opto-electronic oscillators.

SUMMARY

In one aspect, an optical device can be implemented to include an optical resonator that is shaped to include an optical path and supports whispering gallery modes propagating in the optical path and including a selected whispering gallery mode that has a zero electric field at a selected location in the optical path at which electric fields of other whispering gallery modes are not zero. This device also includes a structure formed at the selected location in the optical path of the optical resonator and structured to suppress electric fields of other whispering gallery modes at the selected location to render the selected whispering gallery mode to be a single optical mode in the optical resonator.

In another aspect, a method for maintaining a single optical mode in an optical resonator can be implemented to include providing an optical resonator that is shaped to include an optical path and supports whispering gallery modes propagating in the optical path and including a selected whispering gallery mode that has a zero electric field at a selected location in the optical path at which electric fields of other whispering gallery modes are not zero; and suppressing electric fields of other whispering gallery modes at the selected location in the optical path of the optical resonator to render the selected whispering gallery mode to be a single optical mode present in the optical resonator.

In another aspect, an optical device is implemented to include an optical resonator that is shaped to include a circular optical path and supports whispering gallery modes propagating in an optical path and including a selected whispering gallery mode that has a zero electric field at a selected location in the optical path at which electric fields of other whispering gallery modes are not zero; and an optical coupler located outside the optical resonator near the selected location in the optical path of the optical resonator to be in evanescently coupling with whispering gallery modes at the selected location to suppress electric fields of other whispering gallery modes at the selected location to render the selected whispering gallery mode to be a single optical mode present in the optical resonator.

In another aspect, an optical device is implemented to include a cylindrical rod of an optical material structured to comprise a plurality of optical waveguide loops, which are formed on or near an exterior surface of the cylindrical rod and each surround a longitudinal axis of the cylindrical rod, to form a plurality of optical whispering gallery mode resonators in each of which a whispering gallery mode circulates around a respective optical waveguide loop. Two adjacent optical waveguide loops of the plurality of optical waveguide loops are separated from each other with a spacing to allow optical coupling between the two adjacent optical waveguide loops.

In another aspect, an optical device is implemented to include a cylindrical rod of an optical material structured to comprise a helix of an optical waveguide winding around the cylindrical rod regions in form of a plurality of connected optical waveguide loops forming the helix. Each optical waveguide loop supports at least one optical whispering gallery mode and being close to an adjacent optical waveguide loop located at a different position along the cylindrical rod to be optically coupled with the adjacent optical waveguide loop via spatial overlapping of optical fields extended outside the optical waveguide loop and the adjacent optical waveguide loop.

In yet another aspect, an optical whispering gallery mode resonator device is implemented to include a substrate having a top surface and a bottom surface parallel to the top surface; and an optical material located on the top surface of the substrate and engaged to the substrate, the substrate and the optical material are shaped to collectively form a conical shape in which side surfaces of the substrate and the optical material are flat surfaces and form an angle with respect to the top and bottom surfaces of the substrate. The conical shaped optical material is structured as an optical resonator supporting one or more optical whispering gallery modes circulating around a symmetric axis of the conical shape.

These and other implementations and their properties, operations and fabrications are described in greater detail in the attached drawings, the detailed description and the claims.

BRIEF DESCRIPTION OF THE DRAWINGS

FIGS. 10A, 10B, 11A, 11B and 11C show examples of optical WGM devices formed on a single rod.

DETAILED DESCRIPTION

Many WGM resonators are axially or cylindrically symmetric around a symmetry axis around which the WG modes circulate in a circular path or the equator. The exterior surface of such a resonator is smooth and provides spatial confinement to light around the circular plane to support one or more WG modes. The exterior surface may be curved toward the symmetry axis to spatially confine the light along the symmetry axis. A WGM resonator may be shaped symmetrically around a symmetry axis and has a protruded belt region to form a circular path to confine light in one or more MG modes. The exterior surface of the protruded belt region may be any suitable geometrical shape such as a flat surface or a curved surface. Such a WGM resonator may be configured in any suitable physical size for a given wavelength of light. Various materials can be used for WGM resonators and include, for example, crystal materials and non-crystal materials. Some examples of suitable dielectric materials include fused silica materials, glass materials, lithium niobate materials, and calcium fluoride materials.

Figure 1:
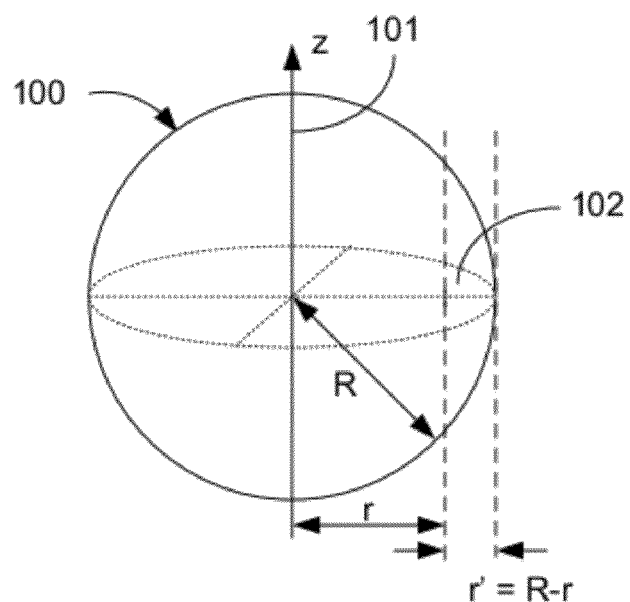
FIGS. 1, 2 and 3 illustrate three geometries of whispering gallery mode resonators.
Figure 2:
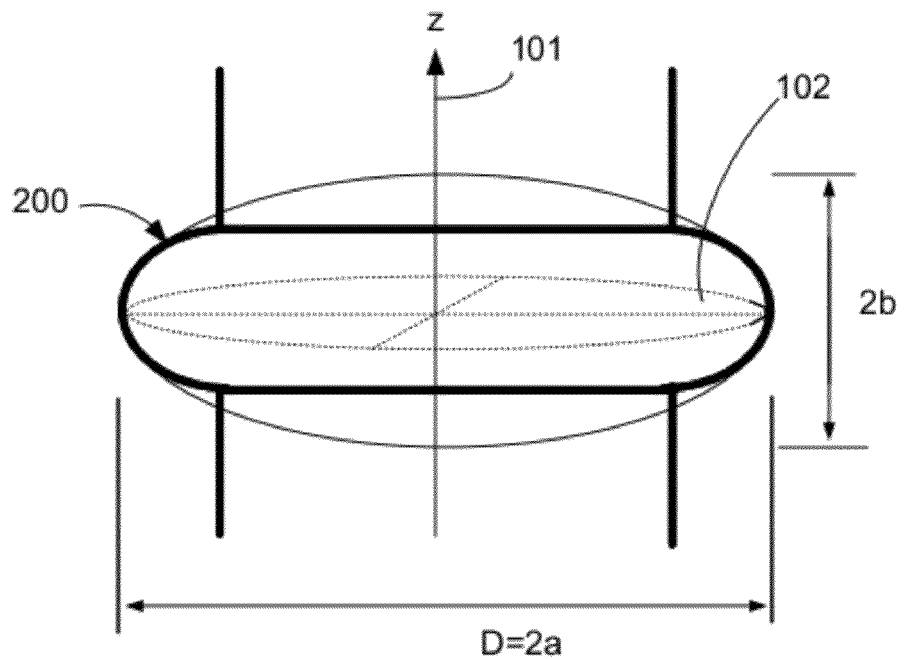
Figure 3:
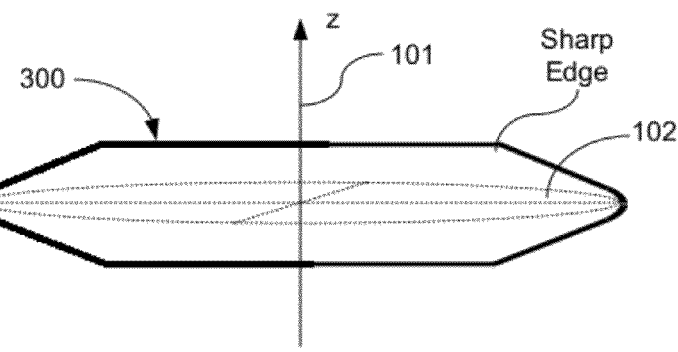

The profile of the exterior surface of a WGM resonator may be selected from a number of geometrical shapes, e.g., spherical, spheroidal, flat and others. FIGS. 1, 2, and 3 illustrate three exemplary geometries of curved exterior surfaces for implementing WGM resonators.

FIG. 1 shows a spherical WGM resonator 100 which is a solid dielectric sphere. The sphere 100 has an equator in the plane 102 which is symmetric around the z axis 101. The circumference of the plane 102 is a circle and the plane 102 is a circular cross section. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheroidal microresonator 200. This resonator 200 may be formed by revolving an ellipse (with axial lengths a and b) around the symmetric axis along the short elliptical axis 101 (z). Therefore, similar to the spherical resonator in FIG. 1, the plane 102 in FIG. 2 also has a circular circumference and is a circular cross section. Different from the design in FIG. 1, the plane 102 in FIG. 2 is a circular cross section of the non-spherical spheroid and around the short ellipsoid axis of the spheroid. The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. More specifically, the geometry of the cavity in the plane in which Z lies such as the zy or zx plane is elliptical. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola. Note that the plane 102 in FIG. 3 is a circular cross section and a WG mode circulates around the circle in the equator.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
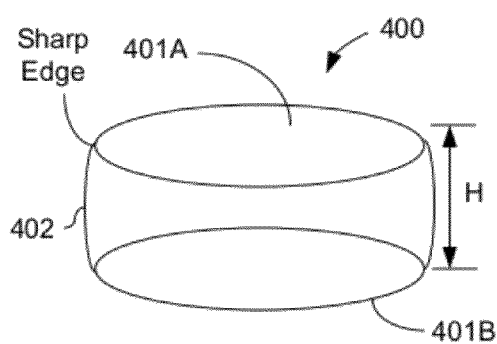
FIGS. 4A and 4B show examples of a disk-shaped and ring-shaped whispering gallery mode resonators.
Figure 4B:
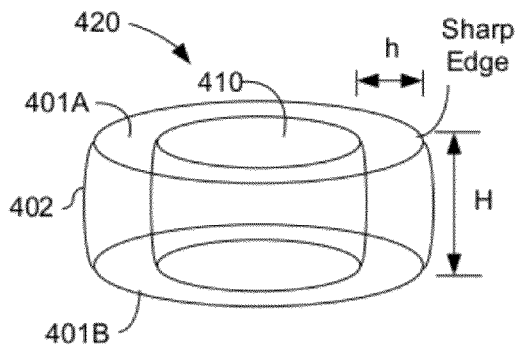

FIGS. 4A and 4B show a disk-shaped WGM resonator 400 and a ring-shaped WGM resonator 420, respectively. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 3, 4A, and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

Figure 5A:
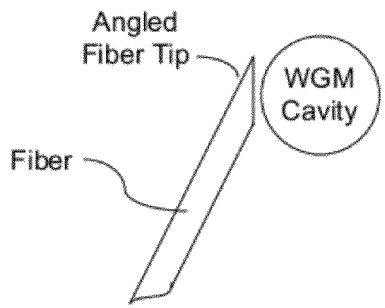
FIGS. 5A, 5B and 5C illustrate three light coupling configurations for whispering gallery mode resonators.
Figure 5B:
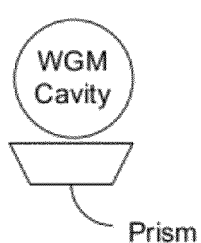
Figure 5C:
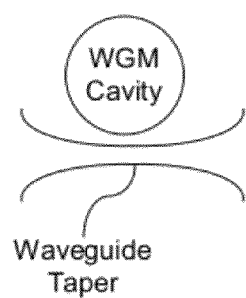

An optical coupler is generally used to couple optical energy into or out of the WGM resonator by evanescent coupling. FIGS. 5A, 5B and 5C show three exemplary optical couplers engaged to a WGM resonator. The optical coupler may be in direct contact with or separated by a gap from the exterior surface of the resonator to effectuate the desired critical coupling. FIG. 5A shows an angle-polished fiber tip as a coupler for the WGM resonator. A waveguide with an angled end facet, such as a planar waveguide or other waveguide, may also be used as the coupler. FIG. 5B shows a micro prism as a coupler for the WGM resonator. FIG. 5C shows a waveguide taper, e.g., a fiber taper formed by stretching a fiber, as a coupler for the WGM resonator. Other evanescent couplers may also be used, such as a coupler formed from a photonic bandgap material.

Other WGM resonator geometries and device designs can be implemented to achieve certain technical features or effects. Specific examples are provided below.

Certain applications of whispering gallery mode resonators require clean optical spectra of the WGM resonators. In many cases performance of the wgmr based device strongly depend on number of modes within the free spectral range (FSR) and their coupling. Various WGM resonator of elliptical or circular shape can have tens of modes per FSR when coupled via a prism or taper coupler. Single-mode WGM resonators can be structured to support the fundamental modes only to produce clean spectra while suppressing higher WG modes based on precise diamond turning and high-speed polishing. Alternatively, as described below, a multi-mode WGM resonators can be structured to select one high-order WG mode while suppressing the fundamental mode and other modes to achieve a single mode operation.

One example method for maintaining a single optical mode in an optical resonator uses an optical resonator that is shaped to include an optical path and supports whispering gallery modes propagating in the optical path and including a selected whispering gallery mode that has a zero electric field at a selected location in the optical path at which electric fields of other whispering gallery modes are not zero. At the selected location in the optical path of the optical resonator, optical fields or electric fields of other whispering gallery modes (e.g., including the fundamental WG mode and other modes) are suppressed to render the selected whispering gallery mode to be a single optical mode present in the optical resonator.

In implementations, a composite multi-mode resonator which supports modes of $l-m=2k+1$ (3, 5, 7 . . . ) index only can be used to achieve the single-mode operation. The boundary of the resonator should not coincide with any surface of any orthogonal coordinate system. One practical approach to achieving this condition is to design the shape of the resonator to have a composite shape which is mixture of two or more orthogonal coordinate systems within the wave propagation region. In this context, such a resonator is a composite resonator and can include a two-index multimode resonator and highly absorptive defects (e.g., one or more quantum dots) at a selected location in the propagation path of the modes to suppress all modes except one selected mode that has a zero optical field at the selected location. The defects can be replaced by highly irradiative elements (e.g., a waveguide taper) placed at its surface in some implementations. Both the defects at the selected location and an irradiative element (e.g., a waveguide taper) near the irradiative element in evanescent coupling with the WGM resonator can be used together to achieve the single-mode operation. Usually optical damping of modes is applied to transverse modes while fundamental mode is meant to be preserved. The present design can be implemented to suppress the fundamental WG mode and other undesired WG modes by, e.g., placing a defect at the location where the electric or optical field of a selected non-fundamental mode is at zero.

Based on this design, an optical device for single mode operation can be implemented to include an optical resonator that is shaped to include an optical path and supports whispering gallery modes propagating in the optical path and including a selected whispering gallery mode that has a zero electric field at a selected location in the optical path at which electric fields of other whispering gallery modes are not zero. In addition, this device includes a structure formed at the selected location in the optical path of the optical resonator and structured to suppress electric fields of other whispering gallery modes at the selected location to render the selected whispering gallery mode to be a single optical mode in the optical resonator.

The above structure at the selected location does not influence bandwidth or effective refractive index of the selected mode which has a zero field at the selected location while all other modes show significant overlapping with the volume occupied by the structure (e.g., a defect that attenuates the light). The three-dimensional shape of the resonator is preselected in a special way to prevent separation of variables in the wave equation. This three dimensional resonator has two mode indices, rather three mode indices, because all modes of a particular azimuthal number l show zeroes in the amplitudes or power levels of their optical fields in different places from the selected location. For that reason only one transverse mode survives in two-index resonator with a defect at the selected location for achieving the single mode operation of the selected mode. The fundamental mode does not survive either since it does not show any zeroes on resonator's surface. A deflect at the selected location with a highly localized spatial profile (e.g., a delta-function defect) would ultimately result in surviving of the only mode through all optical spectra since coordinates of zeroes of optical field of the same l-m mode depend on l index as well. In practical implementations, a defect has a limited strength in suppressing light and a limited size. This aspect of the defect can limit the suppression level of modes pre-selected for extinction and limit the width of the frequency band where modes survive at all when an absorptive defect is used.

Figure 6:
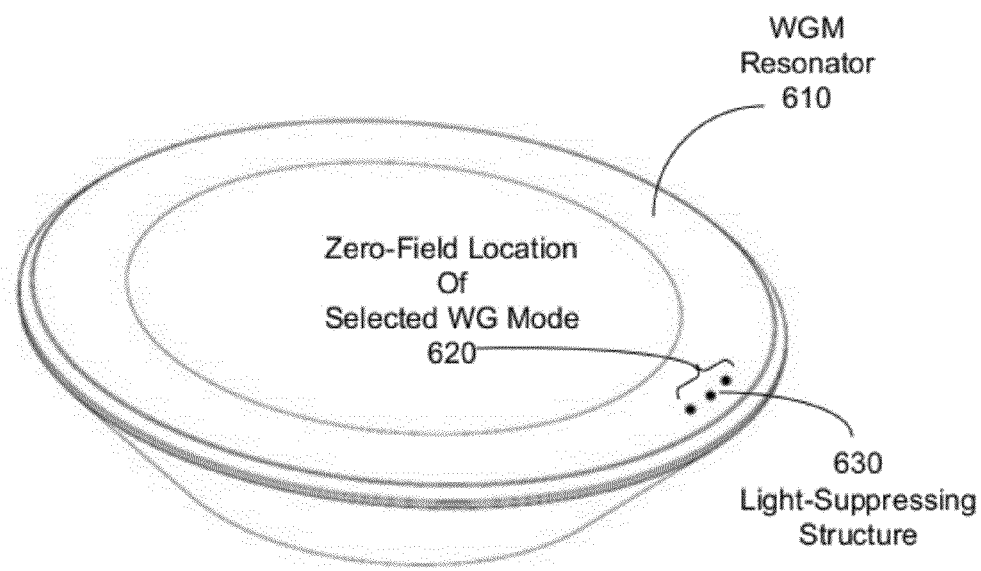
FIGS. 6 and 7 show examples of multi-mode WGM resonators structured to operate at a single WGM mode.

FIG. 6 illustrates a composite WGM resonator 610 that support multiple WG modes. Assume the location 620 is where a selected WG mode has a zero optical field. A light-suppressing structure 630 is placed at the location 620 to suppress light at that location 620. In this case, the optical loss caused by the light-suppressing structure 630 is proportional to the square of the optical field inside the resonator and can be minimized. However, the optical field at this location cannot be completely nullified to zero $0<I=\int |E_s|dv$ due to the nature of the absorptive defect 630. The absorptive mode manipulation suppresses light of all modes in the resonator and suppresses one group of modes more significantly than other modes. As illustrated, the light-suppressing structure 630 can include one or more absorptive defects such as quantum dots that absorb light.

Figure 7:
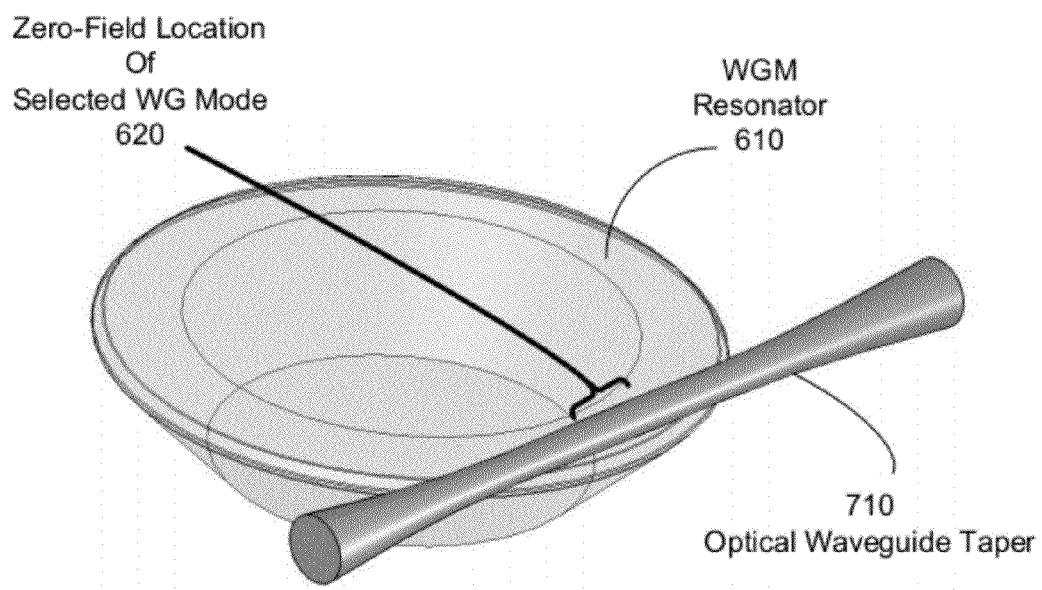

FIG. 7 shows another design by using an optical irradiative element in optical coupling with the WGM resonator to select a single mode while suppressing other modes and the fundamental mode. In the examples in FIGS. 6 and 7, the optical resonator can be made of calcium fluoride or other crystalline material. As illustrated, an optical waveguide taper 710 is provided as the irradiative element to place the taper region to be at the location 620. This selection of the irradiative element position can achieve complete suppression of the optical fields of the fundamental WG mode and other WG modes different from the selected WG mode. The optical loss in this design is proportional to the field overlapping between the optical mode of the coupling element and the optical mode of resonator: $I=\int E_s E^*_c dv$. This field overlapping can be more or less than zero, or exactly equal to zero under the proper coupling condition $I=\int E_s E^*_c dv$.

Figure 8:
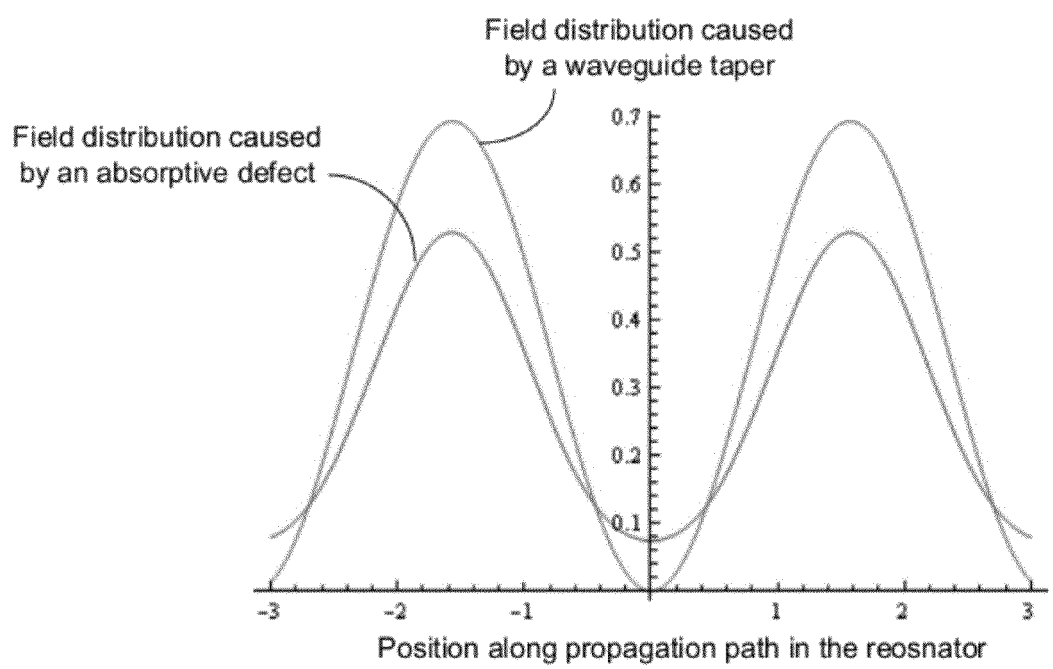
FIGS. 8 and 9 show operation and application associated with the resonators in FIGS. 6 and 7.

FIG. 8 shows suppression of the selected optical mode with absorptive and irradiative elements at a selected location where the selected optical mode reaches zero. The top curve shows the relative suppression of a third transverse mode when the irradiative element is adjusted to change its position along the optical path of the optical modes. At the location where the maximum of the taper's field coincides with the zero field of the resonator, complete suppression other optical modes can be achieved. An additional advantage is that the suppression shows square dependence on the position or the spatial coordinate of the taper and this property makes tuning more reliable. The bottom curve shows the suppression of the third transverse mode with an absorptive element. The suppression in this design has some residual field.

One example of using the above single-mode operation in a multi-mode WGM resonator is a parametric oscillator based on a nonlinear WGM resonator. An example of such an oscillator is described by Savchenkov et al. in "Low Threshold Optical Oscillations in a Whispering Gallery Mode CaF2 Resonator", Phys. Rev. Lett. 93, 243905 (2004). The performance of the demonstrated parametric oscillator depends on the relationship between thresholds of stimulated Raman scattering (SRS) and four wave mixing (FWM). SRS plays the role of noise while FWM is the signal. In the tested $CaF_2$ resonator, SRS gain is approximately two times higher than FWM. In multimode cavities, SRS often has a lower threshold simply because the oscillator's threshold depends not only on gain but on the Q-factor as well. The Raman lasing in the resonator starts in unloaded transverse modes Q-factor of which is much higher. Special techniques are applied to ensure SRS-free start of FWM oscillations. The Q-factor at the Raman shifted frequency is suppressed in a composite single mode cavity which increases the SRS threshold and eliminates this limitation on optical power of the oscillator.

Figure 9:
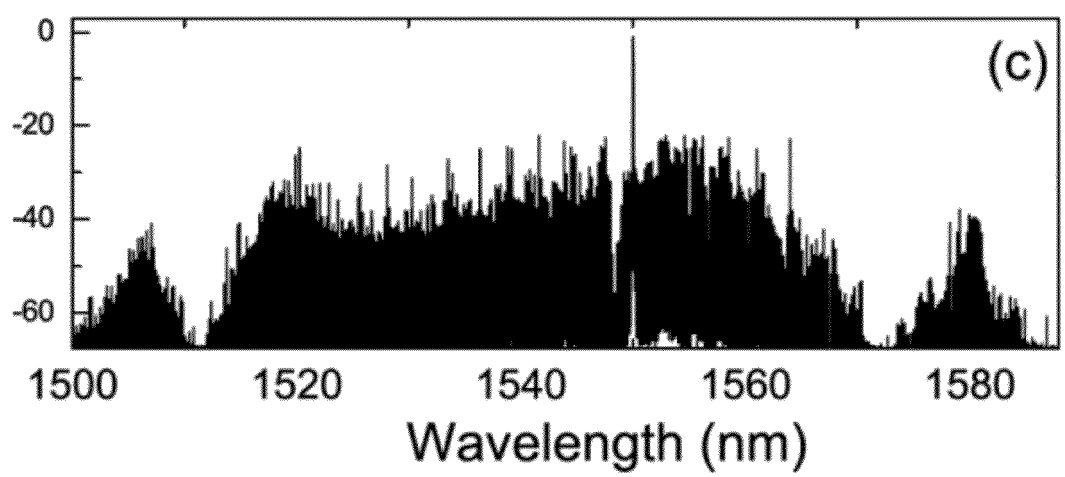

FIG. 9 shows a the spectrum of a demonstrated crystalline multimode comb generator which shows significant interactions of different combs and the resulted non-flat-top envelope of the peaks. A composite single mode cavity described above can be used to control the mode volume without losing the single-mode property which allows controlling oscillator's shot noise, and to substantially reduce the Q-factor at the Raman-shifted frequency. This reduction of the Q-factor at the Raman-shifted frequency leads to clean Raman free start of parametric oscillations.

In optical applications, opto-electronic oscillators (OEOs) for generating RF signals employ high-Q crystalline cavities as replacement for a fiber delay line in the optical part of the OEO loop. The above composite single mode resonator can be used in such OEOs to increase the mode volume without increasing the mode density, to suppress noise caused by various sources such as nonlinear SRS and FWM noise, and thermo-refractive noise, and to achieve a single mode operation to avoid technical difficulties associated with the multi-mode structure of spectra.

In some applications, compact WGM resonator systems with complicated spectral functions are suitable for optical filtering and broadband resonant modulation of light. One method is based on the fabrication of multiple interacting WGM resonators on a single dielectric rod (e.g. single mode resonators). The WGM resonators can be placed close to each other to utilize the inter-resonator coupling to trim the interaction between the resonator modes allowing changes in the spectrum of the whole system of the coupled resonators. Desirable spectral shapes of the passbands of the resonator systems can be constructed in this way.

Figure 10A:
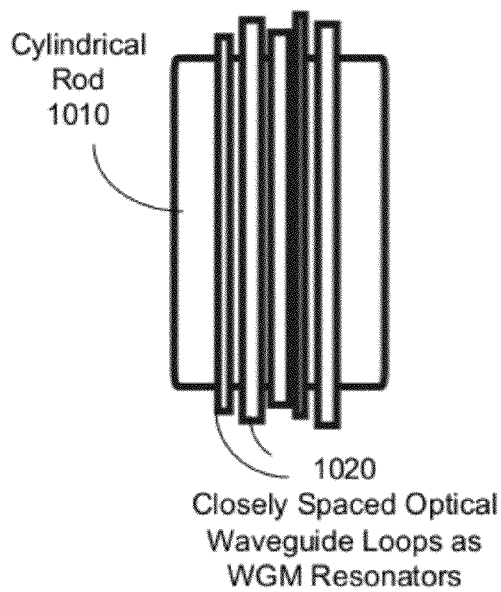
Figure 10B:
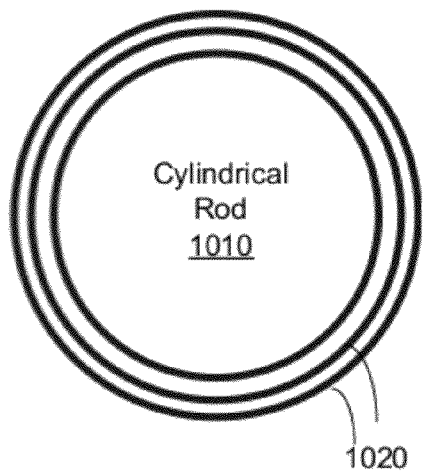

FIGS. 10A and 10B show one implementation in which such a multi-resonator device includes a cylindrical rod 1010 of an optical material structured to include optical waveguide loops 1020, which are formed on or near an exterior surface of the cylindrical rod 1010 and each surround a longitudinal axis of the cylindrical rod 1010. The optical waveguide loops 1020 form optical whispering gallery mode resonators in each of which a whispering gallery mode circulates around a respective optical waveguide loop 1020. Two adjacent optical waveguide loops 1020 of the optical waveguide loops 1020 are separated from each other with a spacing to allow optical coupling between the two adjacent optical waveguide loops 1020. In some implementations, the WGM resonators formed by the optical waveguide loops 1020 can be multiple single mode resonators created on the surface of a cylindrical perform by forming protrusion rings or belts on the rod surface. In other implementations where an electrical control is desired, the rod 1010 can be made out of an electro-optic material exhibiting an opto-electro effect to allow an optical refractive index of the electro-optic material to be altered in a region where an electrical control signal is applied. Such a rod can be coated with multiple electrodes. Application of various voltages to the electrodes cause the formation of the resonator structure with the multiple loops to achieve a desirable spectrum and to provide a tuning mechanism that tunes or controls the optical refractive index of each optical waveguide loop formed based on the opto-electric effect.

The fabrication of whispering gallery mode (WGM) resonators having complicated spectra is important for multiple practical applications. Fabricating multiple interacting resonators on a single dielectric rod can be used to provide some advantages. A several micron sized protrusion on the top of a dielectric rod can form a WGM resonator possessing a single mode family. Several protrusions placed less than several microns apart from each other create the set of coupled resonators. The proposed multi-resonator design on a single rod allows a selection of the geometrical sizes of the protrusions (which may single mode resonators or multi-mode resonators) and the distance between them to achieve certain operating behaviors. For example, such coupled resonators can create a desired optical spectral form in the optical transmission. In some implementations, the multiple resonators are placed on the same rod and from the same material as the rod and the coupling between the resonators can be achieved within the rod. The resultant resonator consisting of multiple single mode resonators can be considered as a single integral WGM resonator with a complicated morphology. This structure for multiple resonators can have high thermal stability and behave like a single entity. No separate temperature stabilization devices are needed for the multiple resonators. In designs where the resonant structure made out of an electro-optic material can allow fabrication of resonant electro-optic modulators possessing both large finesse and wide bandwidth.

FIGS. 11A, 11B and 11C show another WGM optical device formed a cylindrical rod. This device includes a cylindrical rod 1110 of an optical material structured to include a helix 1120 of an optical waveguide winding around the cylindrical rod in form of connected optical waveguide loops forming the helix 1120. Each optical waveguide loop supports at least one optical whispering gallery mode and is close to an adjacent optical waveguide loop located at a different position along the cylindrical rod to be optically coupled with the adjacent optical waveguide loop via spatial overlapping of optical fields extended outside the optical waveguide loop and the adjacent optical waveguide loop. In one implementation, the helix 1120 of the optical waveguide on the cylindrical rod 1110 can be a protrusion belt winding around an exterior surface of the cylindrical rod 1110. The interacting circular protrusions one can create a helicoidal protrusion as an optical waveguide. If the step of the helix is small enough the different parts of the helicoids interact with each other creating complicated optical spectrum. This spectrum can be managed by changing the step of the helix as well as the contrast of the protrusion. In another implementation, the helix 1120 of the optical waveguide on the cylindrical rod 1110 has an optical refractive index different from an optical refractive index of a region immediately outside and in contact with the optical waveguide. To create real time reconfigurable spectral structure based on the whispering gallery modes, small electrodes can be formed on the surface of a cylindrical electro-optic preform. Application of external voltage to the electrodes result in the change of the refractive index of the material which, in turn, creates the interacting waveguides in the cylinder. Changing the properties of the waveguides allows to create structures with the complicated spectrum. The structure of the spectrum can be tuned in the real time based on the electro-optic effect of the rod.

In the above examples in FIGS. 10A, 10B, 11A, 11B and 11C, the interacting resonators and waveguides can be created on the surface and in the body of a photosensitive cylindrical perform using laser light. For instance, the waveguides can be made from a photosensitive material and created with UV laser focused on the waveguide surface. For example, the cylinder can be made out of a Ge doped glass. The UV light changes the index of refraction of the material and the pattern of the UV light projected on to the rod creates a pattern of the desired waveguides or resonators on the rod.

Figure 12A:
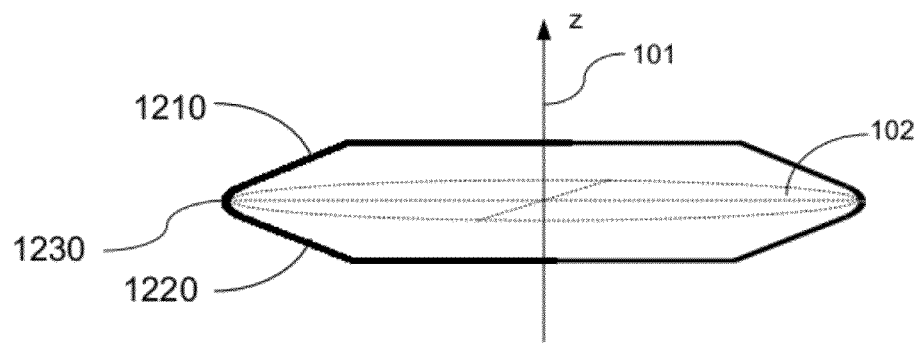
FIGS. 12A, 12B and 12C show examples of a WGM resonator with a complex geometry.
Figure 12B:
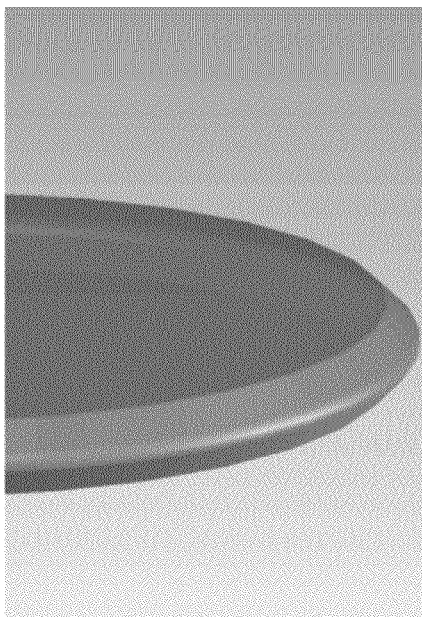
Figure 12C:
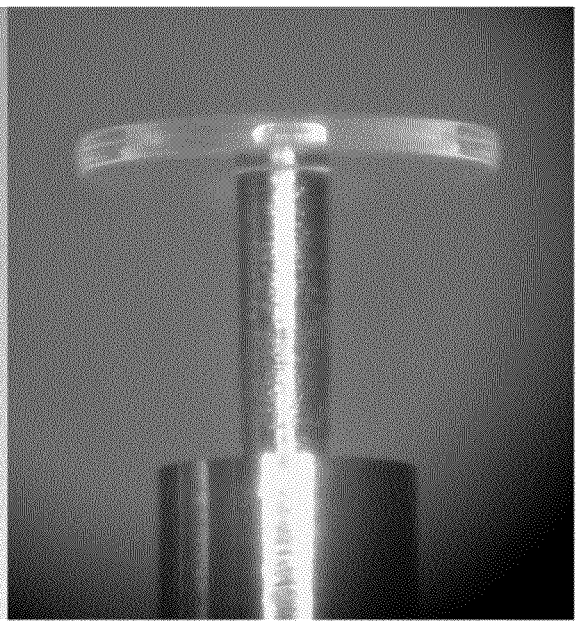

High-Q WGM crystalline resonators can have a complex geometry. For example, as shown in the example in FIG. 12A, the resonator profile can include two chamfers 1210 and 1229 connected with curve with very specific radius of curvature. FIGS. 12B and 12C show examples of such a WGM resonator with a complex geometry.

Manufacturing of such resonators via polishing may require multiple manual operations. First, an irregular crystalline wafer is converted to a small drum and edges of the drum are polished until chamfers 1210 and 1220 of particular size are created. The rim 1230 of the resonator is polished until specific radius of curvature is obtained. Every operation requires multiple measurements. Manufacturing of every resonator is a time-consuming and labor-intensive process and requires skillful personnel.

A WGM resonator can be designed to have a simple geometry to simplify the fabrication and to allow for mass production. As an example, an optical whispering gallery mode resonator device can include a substrate having a top surface and a bottom surface parallel to the top surface and an optical material located on the top surface of the substrate and engaged to the substrate. The substrate and the optical material are shaped to collectively form a conical shape in which side surfaces of the substrate and the optical material are flat surfaces and form an angle with respect to the top and bottom surfaces of the substrate. The conical shaped optical material is structured as an optical resonator supporting one or more optical whispering gallery modes circulating around a symmetric axis of the conical shape.

Figure 13:
FIG. 13 shows an example of a WGM resonator with a simple geometry for easy fabrication.

In implementations, a WGM resonator can include two optically bonded wafers. The substrate or wafer can be made of a metal or a transparent material of a low refractive index that is lower than the material of the top wafer for forming the resonator. The top wafer is made of a target material, such as a crystal, for instance, lithium tantalate in case of WGM-based receiver, or MgF2 in case of a WGM-based filter. FIG. 13 shows an example of a simplified conical shaped WGM resonator where a bottom flint glass substrate is bonded to a top MgF2 wafer and both are shaped together as a cone. The side surfaces of the wafers are flat without the complex chamfers and curve shown in FIGS. 12A-C.

Figure 14:
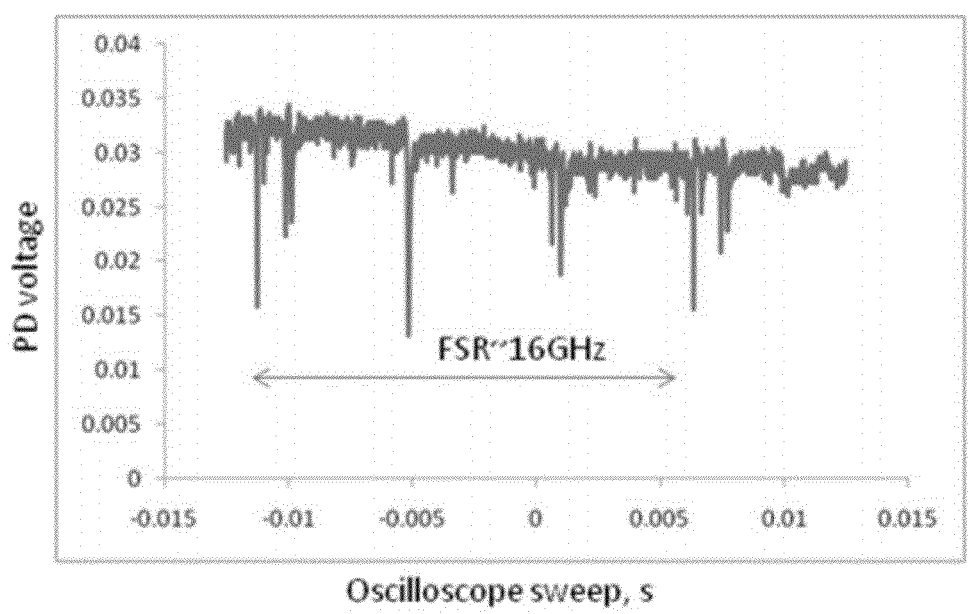
FIG. 14 shows an example spectrum measured from a resonator based on the design in FIG. 13.

FIG. 14 shows an example of a measured spectrum of a conical WGM resonator made from tantalite with a prism coupler. The optical field in the conical resonator is limited by two surfaces: bottom low-index-to-tantalate and top air-to-tantalate cone surface. The LiTaO3 resonator is coupled to a diamond prism coupler with a 32-degree conical inclination for the critical coupling for the resonator. Such a resonator of a simplified shape demonstrates a high Q-factor ultimately limited by the optical transparency of the crystal itself.

Simplified shape of resonator allows faster manufacturing by turning. Manufacturing can be accomplished by one simple polishing step. Such a resonator allows mass production on wafer without mounting each resonator on pin. Mass production may involve core drilling and lithography. For example, a method for fabricating an optical whispering gallery mode resonator device can include providing a substrate having a top surface and a bottom surface parallel to the top surface; placing an optical material on the top surface of the substrate to engage the optical material to the substrate; and shaping the engaged substrate and the optical material together to form a conical shape in the engaged substrate and the optical material to make the conical shaped optical material an optical resonator supporting one or more optical whispering gallery modes circulating around a symmetric axis of the conical shape.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. Variations and enhancements to the described implementations and other implementations can be made based on what is disclosed.

What is claimed is:

1. An optical device having an optical whispering gallery mode resonator, comprising:
   an optical resonator that is shaped to include an optical path and supports whispering gallery modes propagating in the optical path and including a selected whispering gallery mode that has a zero electric field at a selected location in the optical path at which electric fields of other whispering gallery modes are not zero; and
   an optically absorptive structure formed at the selected location in the optical path of the optical resonator and structured to absorb light of the other whispering gallery modes at the selected location without absorbing light in the selected whispering gallery mode so as to sustain the light in the selected whispering gallery mode as a single optical mode in the optical resonator while suppressing the other whispering gallery modes.

2. The device as in claim 1, wherein the optically absorptive structure formed at the selected location includes one or more quantum dots.

3. The device as in claim 1, wherein the optical resonator is made of a crystalline material.

4. The device as in claim 1, comprising an optical coupler coupled to the optical resonator to evanescently couple light into the optical resonator in the selected whispering gallery mode.

5. A method for maintaining a single optical mode in an optical resonator, comprising:

providing an optical resonator that is shaped to include an optical path and supports whispering gallery modes propagating in the optical path and including a selected whispering gallery mode that has a zero electric field at a selected location in the optical path at which electric fields of other whispering gallery modes are not zero; and attenuating light at the selected location in the optical path of the optical resonator to suppress light of the other whispering gallery modes at the selected location without attenuating light in the selected whispering gallery mode so as render the selected whispering gallery mode to be a single optical mode present in the optical resonator.

6. The method as in claim 5, wherein the attenuating light at the selected location in the optical path of the optical resonator includes forming an optically absorptive structure at the selected location in the optical resonator to absorb light at the selected location inside the optical resonator.

7. The method as in claim 5, wherein the attenuating light at the selected location in the optical path of the optical resonator includes using one or more optically irradiative elements at the selected location to be in evanescent coupling with the optical resonator to cause attention of light at the selected location inside the optical resonator.

8. The method as in claim 7, wherein the one or more optically irradiative elements include an optical waveguide, located outside the optical resonator and near the selected location in the optical resonator, to evanescently couple to a whispering gallery mode of the optical resonator that has a non-zero amplitude at the selected location to cause attention of the whispering gallery mode.

9. An optical device having an optical whispering gallery mode resonator, comprising:

an optical resonator that is shaped to include a circular optical path and supports whispering gallery modes propagating in an optical path and including a selected whispering gallery mode that has a zero electric field at a selected location in the optical path at which electric fields of other whispering gallery modes are not zero; and an optical coupler located outside the optical resonator near the selected location in the optical path of the optical resonator to be in evanescently coupling with whispering gallery modes at the selected location to suppress electric fields of other whispering gallery modes at the selected location to render the selected whispering gallery mode to be a single optical mode present in the optical resonator.

10. The device as in claim 9, wherein the optical coupler includes an optical waveguide.

11. The device as in claim 9, wherein the resonator is made of a crystalline material.

* * * * *

UNITED STATES PATENT AND TRADEMARK OFFICE
CERTIFICATE OF CORRECTION

PATENT NO.        : 8,289,616 B1
APPLICATION NO.   : 13/357023
DATED             : October 16, 2012
INVENTOR(S)       : Lute Maleki et al.

It is certified that error appears in the above-identified patent and that said Letters Patent is hereby corrected as shown below:

On Title Page, in Field (56), in Column 2, under "OTHER PUBLICATIONS", Line 2, delete "Schloenfeld," and insert -- Schoenfeld, --, therefor.

On Title Page 2, in Field (56), in Column 2, under "OTHER PUBLICATIONS", Line 12, delete "Sympsoium" and insert -- Symposium --, therefor.

On Title Page 3, in Field (56), in Column 2, under "OTHER PUBLICATIONS", Lines 17-18, delete "Tecnhology," and insert -- Technology, --, therefor.

In Fig. 8, Sheet 4 of 8, delete "in the reosnator" and insert -- in the resonator --, therefor.

In Fig. 11A, Sheet 6 of 8, delete "Hilex formed" and insert -- Helix formed --, therefor.

In Fig. 11B, Sheet 6 of 8, delete "Hilex formed" and insert -- Helix formed --, therefor.

In Column 3, Line 29, delete "MG" and insert -- WG --, therefor.

In Column 5, Line 6, delete "wgmr" and insert -- WGM resonators --, therefor.

In Column 6, Line 38, delete "$0<I=\int |E_s| dv$" and insert -- $0<I=\int |E_s|^2 dv$ --, therefor.

In Column 7, Line 28, delete "a the" and insert -- the --, therefor.

In Column 11, Line 12, in Claim 5, delete "so as" and insert -- so as to --, therefor.

Signed and Sealed this
Fifteenth Day of January, 2013

David J. Kappos
*Director of the United States Patent and Trademark Office*